(12) United States Patent
Rompel et al.

(10) Patent No.: US 7,225,714 B2
(45) Date of Patent: Jun. 5, 2007

(54) TOOTH FORM DESIGN FOR RECIPROCATING SAW BLADE

(75) Inventors: Markus Rompel, Runkel/Schadeck (DE); Malek George, Valrico, FL (US); Rickey Thomas, Manchester, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/023,097

(22) Filed: Dec. 22, 2004

(65) Prior Publication Data

US 2006/0130628 A1    Jun. 22, 2006

(51) Int. Cl.
*B27B 33/02* (2006.01)
*B23D 63/00* (2006.01)

(52) U.S. Cl. .............. 83/835; 83/848; 83/851; 83/855; 76/112

(58) Field of Classification Search .......... 83/835, 83/848, 846, 847, 851, 849, 850, 661, 836, 83/839, 855, 663, 853, 852, 838; 76/112, 76/25.1, 29, 115
See application file for complete search history.

(56) References Cited

U.S. PATENT DOCUMENTS

| | | |
|---|---|---|
| 85,417 A | 12/1868 | Andrews |
| 186,814 A | 1/1877 | Disston |
| 277,141 A | 5/1883 | Learned |
| D31,362 S | 8/1899 | McDonner |
| 1,919,748 A | 7/1933 | Roberts |
| 2,573,573 A | 10/1951 | Jenkins |
| 2,646,094 A | 7/1953 | Russell |
| 2,736,351 A | 2/1956 | Baker |
| 2,783,792 A | 3/1957 | Keesling |
| 2,784,751 A | 3/1957 | Alexander |
| 2,808,082 A | 10/1957 | Moretti et al. |
| 2,890,728 A | 6/1959 | Craven |
| 3,017,908 A | 1/1962 | Higbee |
| 3,028,889 A | 4/1962 | McCarty |
| 3,033,251 A | 5/1962 | Atkinson et al. |
| 3,056,437 A | 10/1962 | Mittins |
| 3,072,164 A | 1/1963 | Ramirez et al. |
| 3,109,464 A | 11/1963 | LaForce |
| 3,111,970 A | 11/1963 | Priest et al. |
| 3,186,726 A | 6/1965 | Wilhelm et al. |
| 3,314,456 A | 4/1967 | Craven |
| 3,357,462 A | 12/1967 | Craven |
| 3,374,815 A * | 3/1968 | Anderson, Jr. et al. ....... 83/852 |
| 3,416,579 A | 12/1968 | Cowley |
| 3,477,479 A | 11/1969 | Doty |
| 3,573,857 A | 4/1971 | Sederberg |

(Continued)

FOREIGN PATENT DOCUMENTS

DE    923 089    3/1955

(Continued)

*Primary Examiner*—Boyer D. Ashley
*Assistant Examiner*—Ghassem Alie
(74) *Attorney, Agent, or Firm*—Harness, Dickey & Pierce, P.L.C.

(57) ABSTRACT

A reciprocating saw has a tooth form that decreases the cutting time of the saw blade and extends the life of the saw blade. The tooth height is longer than conventional metal cutting reciprocating saws. Also, the tooth form has a larger gullet. The tooth rake angle remains substantially constant during the life of the saw blade.

10 Claims, 1 Drawing Sheet

U.S. PATENT DOCUMENTS

| | | | |
|---|---|---|---|
| 3,630,699 A | 12/1971 | Catlin | |
| 3,680,610 A | 8/1972 | Lindgren | |
| 3,695,344 A | 10/1972 | Schnizler, Jr. | |
| 3,716,916 A | 2/1973 | Alexander | |
| 3,803,681 A | 4/1974 | Williams | |
| 3,805,383 A | 4/1974 | McNally | |
| 3,925,867 A | 12/1975 | Kareman | |
| 3,964,163 A | 6/1976 | Russo | |
| 3,977,289 A | 8/1976 | Tuke | |
| 4,179,967 A * | 12/1979 | Clark | 83/846 |
| 4,232,578 A | 11/1980 | Stellinger et al. | |
| 4,292,871 A | 10/1981 | Neumeyer et al. | |
| 4,345,499 A | 8/1982 | Ross | |
| 4,587,876 A * | 5/1986 | Erhardt | 83/839 |
| 4,688,458 A * | 8/1987 | Krilov | 83/661 |
| 4,784,033 A * | 11/1988 | Hayden et al. | 83/661 |
| 4,784,034 A | 11/1988 | Stones et al. | |
| 4,798,001 A | 1/1989 | Grossmann et al. | |
| 4,893,411 A | 1/1990 | Leini | |
| 4,958,546 A * | 9/1990 | Yoshida et al. | 83/848 |
| 5,016,356 A | 5/1991 | Trench | |
| 5,018,421 A * | 5/1991 | Lucki et al. | 83/835 |
| D322,020 S | 12/1991 | Grachan | |
| 5,119,708 A | 6/1992 | Musgrove | |
| 5,249,485 A * | 10/1993 | Hayden, Sr. | 76/112 |
| 5,517,889 A | 5/1996 | Logan | |
| 5,603,252 A | 2/1997 | Hayden, Sr. | |
| 5,803,678 A | 9/1998 | Korb et al. | |
| 5,855,158 A | 1/1999 | Donofrio | |
| 5,884,547 A * | 3/1999 | Carlsen et al. | 83/835 |
| D415,401 S | 10/1999 | Imboden et al. | |
| 6,003,422 A * | 12/1999 | Holston | 83/661 |
| 6,065,380 A | 5/2000 | Lundh | |
| D427,865 S | 7/2000 | Mills, Jr. | |
| 6,125,544 A | 10/2000 | Eriksson et al. | |
| 6,145,426 A | 11/2000 | Ward et al. | |
| 6,158,324 A | 12/2000 | Kullmann et al. | |
| 6,167,792 B1 * | 1/2001 | Korb et al. | 83/835 |
| 6,244,152 B1 | 6/2001 | Di Nicolantonio | |
| 6,276,248 B1 | 8/2001 | Cranna | |
| 6,339,843 B1 | 1/2002 | Grillot et al. | |
| 6,357,123 B1 | 3/2002 | Manuel | |
| 6,401,585 B1 | 6/2002 | Morgan | |
| 6,532,855 B1 | 3/2003 | Ward et al. | |
| 6,601,495 B2 | 8/2003 | Cranna | |
| 6,782,781 B2 | 8/2004 | Rack | |
| 2002/0184988 A1 | 12/2002 | Rohman et al. | |
| 2002/0194975 A1 | 12/2002 | Bishop | |
| 2003/0010179 A1 | 1/2003 | McLuen | |
| 2003/0024354 A1 | 2/2003 | Ward et al. | |
| 2003/0051593 A1 | 3/2003 | Kocher et al. | |
| 2003/0089215 A1 * | 5/2003 | Alton | 83/848 |
| 2003/0116006 A1 * | 6/2003 | Graf | 83/835 |
| 2003/0121388 A1 | 7/2003 | Wheeler et al. | |
| 2003/0192419 A1 | 10/2003 | Conti | |
| 2004/0050234 A1 * | 3/2004 | Fluhrer et al. | 83/835 |
| 2004/0182218 A1 * | 9/2004 | Chao | 83/848 |
| 2004/0221461 A1 | 11/2004 | Knisley et al. | |
| 2004/0255749 A1 * | 12/2004 | Hayden, Sr. | 83/788 |
| 2005/0028664 A1 * | 2/2005 | Terada et al. | 83/835 |
| 2005/0211046 A1 * | 9/2005 | Thomas et al. | 83/855 |
| 2006/0065098 A1 * | 3/2006 | Cranna | 83/661 |
| 2006/0130629 A1 * | 6/2006 | Rompel et al. | 83/835 |

FOREIGN PATENT DOCUMENTS

| | | |
|---|---|---|
| DE | 76 16 080 | 11/1976 |
| DE | 78 29 113 | 5/1980 |
| DE | 37 41 709 | 6/1989 |
| DE | 90 15 452 | 3/1991 |
| DE | 195 01 019 | 7/1996 |
| DE | 196 81 464 | 4/1999 |
| EP | 0 009 512 | 6/1982 |
| EP | 0 726 829 | 3/2000 |
| EP | 0 814 935 | 11/2001 |
| WO | WO 01/32340 | 5/2001 |
| WO | WO 02/06020 | 1/2002 |

* cited by examiner

TOOTH FORM DESIGN FOR RECIPROCATING SAW BLADE

BACKGROUND OF THE INVENTION

The present invention relates to saw blades and, more particularly, to a tooth form for reciprocating saw blades.

Reciprocating saws are utilized to cut metallic and wooden materials. Ordinarily, when utilizing a reciprocating saw blade, the user generally looks at various aspects of the saw blade. When choosing a reciprocating saw blade, the user considers the expectant life of the saw blade; how many cuts before saw blade replacement occurs. Secondly, the user is concerned with the speed of the saw blade, how fast the saw blade cuts through the material. Next the user considers the durability of the saw blade; how long it will last under normal wear and tear. Finally, the user is concerned with the accuracy of the saw blade; how well will the saw blade follow its intended line of cut.

The present invention provides the art with a reciprocating saw blade utilized for cutting a metallic material. The saw blade increases the life of the saw blade as well as the speed of cut of the saw blade.

According to the present invention, a reciprocating saw blade comprises a rake cut face having a first end forming a tip and a second end being continuous with the first gullet. A relief face extends from the tip of the rake face and is continuous with a second gullet. The rake face defines a relief angle of between about 38° to about 42°. The rake face and the relief face define an included angle of about 45° to about 50°. The rake face has a desired tooth depth wherein the tooth depth is about 30% to 47% of the maximum gullet depth and about 18% to 26% of a pitch length. The first and second gullet have a radius of about 52% to 55% of the maximum gullet depth. Also, the rake face has an angle from about 0° to about 3°. The relief angle is about 40° and the included angle is about 50°.

According to a second aspect of the invention, reciprocating blade has a plurality of teeth comprising said teeth having a tooth form including a rake face with a first end forming a tip and a second end being continuously with the first gullet. A relief face extend from the tip of the rake face and is continuous with the second gullet. The relief face defines a relief angle of between about 38° to about 42°. The rake face and the relief face define an included angle from about 45° to 50°. The rake face has a desired tooth depth such that the tooth depth is about 30% to 47% of a maximum gullet depth and about 18% to 26% of the pitch depth. The saw blade includes set and unset teeth wherein the unset tooth is considered a raker tooth.

From the following detailed description taken in conjunction with the attached drawings and claims, other objects and advantages of the present invention will become apparent to those skilled in the art.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 3:
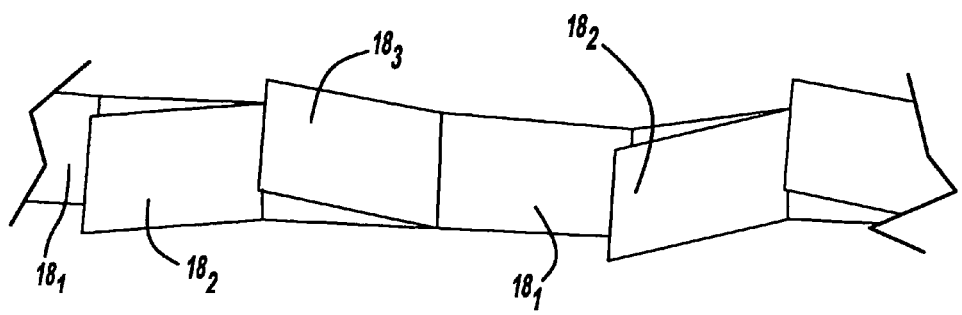
FIG. 3 is an enlarged top plan view of a portion of the saw blade of FIG. 1.

Turning to the figures, a reciprocating saw blade is illustrated and designated with the reference numeral 10. The saw blade 10 includes a body 12, a connecting portion 14, and a cutting portion 16. The cutting portion 16 includes a plurality of teeth 18. The teeth 18 can have a raker style set wherein a first tooth $18_1$ is neutral or in the plane of the body 12 with a second tooth $18_2$ offset to the left and a third tooth $18_3$ offset to the right with a repeating pattern as seen in FIG. 3.

Figure 1:
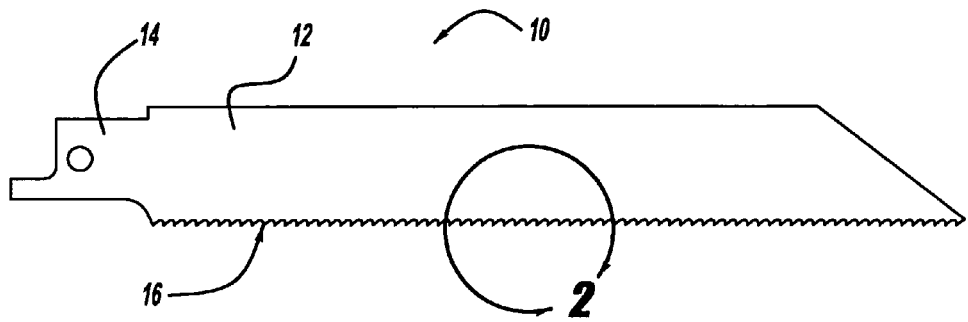
FIG. 1 is a side view of a reciprocating saw blade in accordance with the present invention.
Figure 2:
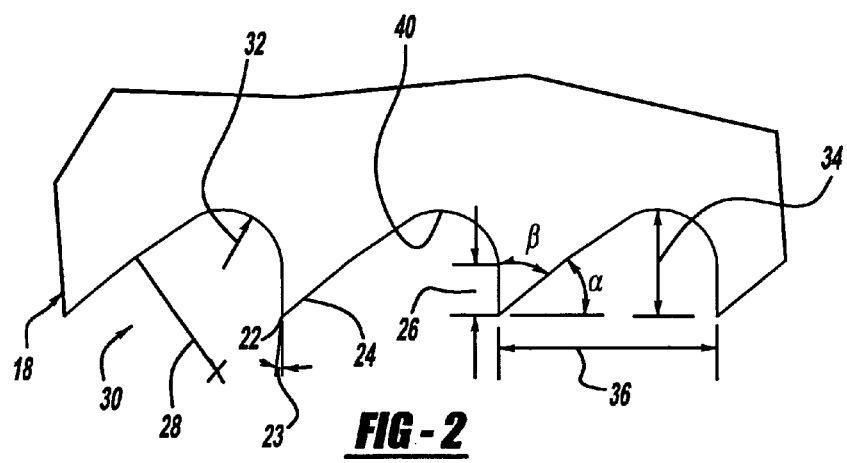
FIG. 2 is an enlarged side view of a tooth form in accordance with the present invention.

Turning to FIG. 2, an enlarged tooth form is illustrated. The tooth 18 has a rake face 22 and a relief face 24. The rake face 22 is ordinarily perpendicular to the horizon and thus is a zero angle rake face. However, the rake angle 23 may be modified up to a 3° rake face angle. The rake face 22 or land has a tooth depth identified by the numeral 26. The relief face 24 is defined by a relief angle a of between 38°-42°. Preferably, the relief angle is about 40°. The relief face 24 is continuous with a curved portion 28 of the gullet 30.

The tooth form has a desired included angle $\beta$ of between 45° to 50°. The included angle $\beta$ preferably is between 47° to 50°. The increase in the included angle provides the tooth with additional mass which, in turn, increases the strength of the tooth.

The gullet 30 has a radius defined by the numeral 32. The tooth depth 26 and the gullet radius 32 defines the maximum gullet depth or tooth height 34. The pitch, designated with the reference numeral 36, is the distance between the tips of adjacent teeth.

Tooth depth 26 is a length from the tip of the tooth 18 to the curved portion 40 of the gullet 30. Tooth depth 26 has a length from about 30% to about 50% of the tooth height or maximum gullet depth. Preferably, the tooth depth is between 38% to 46% of the tooth height or maximum gullet depth.

The gullet deepest point, defined by radius 32, has a length between 50% to 55% of the length of the tooth height or maximum gullet depth 34. Preferably, the radius 32 length is between 52% to 55% of the length of the tooth height or maximum gullet length. Also, the radius 32 is between 20% to 27% of the length of the pitch 36. Preferably, the radius 32 is about 27% of the length of the pitch 36.

The tooth design has a second radius 28 starting on the maximum depth of the gullet to the relief face. This radius increases the material on the tooth base, reduces stress and adds durability to the tooth.

The present tooth form is longer than current teeth forms used for metal cutting reciprocating blades. The tooth depth length is between 45% to 55% of the length of the pitch length. Preferably, the tooth depth has a length between 49% to 52% of the pitch length. Also, the gullet has a larger area and a more round arc than current teeth forms used for metal cutting reciprocating blades.

The present design has teeth that are longer than the prior art. Likewise, by having a constant rake face angle, the present invention provides a constant cutting angle over the life of the saw blade. Also, by having the desired relief angle, the saw blade of the present invention has a deeper penetration into the material it is cutting. Also, the present design has a larger gullet area than the prior art design. The larger gullet area enables the present invention to eject chips faster from the cutting area which, in turn, enables the blade to cut faster. This combined with the longer tooth at the desired angles provides a saw blade that cuts faster and has a longer life.

The reciprocating saw blades of the present invention are preferably heat treated. The heat treating is such that the blades are heat treated for between 5-25 minutes at temperatures between 1950-2200F. This provides a desired carbide micro-structure in the saw blade. Preferably, the exposure time is 10-20 minutes at a temperature of between 2100-2150F. Ordinarily, the blades are tempered at least two or more times at a desired tempering temperature.

The present reciprocating saw blade increases the cuts per blade. Also, the present saw blade decreases the cutting time through a particular metal material. Further, the present invention reduces the wear slope of the tooth of the saw blade. This means that during use, as the teeth wear, the slope or rake face angle of the tooth form varies less from its original slope than currently available reciprocating saw blades.

While the above detailed description provides the preferred embodiments of the present invention, those skilled in the art will appreciate that variation, alteration and modifications are possible without deviating from the scope and spirit of the present invention.

What is claimed is:

1. A reciprocating saw blade tooth form comprising:
    a rake face and a relief face, said rake face intersecting said relief face at a tip of said tooth form;
    said rake face extending from said tip to a first gullet, said rake face being continuous with said gullet;
    said relief face extending from said tip to a second gullet, said relief face continuous with said second gullet, said relief face being on an angle with respect to a horizontal plane at the intersection of said relief face and said rake face, said angle defining a relief angle;
    said rake face being on an angle with respect to a vertical plane at the intersection of said relief face and said rake face, said angle defining a rake angle;
    an included angle is defined as the angle between the relief face and the rake face;
    a tooth depth is a length from said tip of the tooth to a curved portion of the gullet;
    a maximum gullet depth is a distance from said tip to the bottom of the first gullet;
    a pitch length is a distance between adjacent tips;
    said relief angle being between about 38° to about 42°, said included angle being from about 45° to about 50° and said tooth depth being about 30% to about 47% of the maximum gullet depth and about 18% to about 26% of the pitch length wherein said tooth form enables better chip ejection which enables faster cutting of the blade; and
    said first and second gullets are defined by a radius, the radius has a length having a radius of about 52% to about 55% of the maximum gullet depth.

2. The reciprocating saw blade according to claim 1 wherein said rake face angle is from about 0° to about 3°.

3. The reciprocating saw blade according to claim 1 wherein said relief angle is about 40°.

4. The reciprocating saw blade according to claim 3 wherein said included angle is about 50°.

5. The reciprocating saw blade according to claim 4 wherein said rake face angle is about 0°.

6. The reciprocating saw blade according to claim 3 wherein said included angle is about 47°.

7. The reciprocating saw blade according to claim 6 wherein said rake angle is about 3°.

8. A reciprocating saw blade having a plurality of teeth, comprising:
    said teeth each having a tooth form including:
    a rake face and a relief face, said rake face intersecting said relief face at a tip of said tooth form;
    said rake face extending from said tip to a first gullet, said rake face being continuous with said gullet;
    said relief face extending from said tip to a second gullet, said relief face continuous with said second gullet, said relief face being on an angle with respect to a horizontal plane at the intersection of said relief face and said rake face, said angle defining a relief angle;
    said rake face being on an angle with respect to a vertical plane at the intersection of said relief face and said rake face, said angle defining a rake angle;
    an included angle is defined as the angle between the relief face and the rake face;
    a tooth depth is a length from said tip the tooth to a curved portion of the gullet;
    a maximum gullet depth is a distance from said tip to the bottom of the first gullet;
    a pitch length is a distance between adjacent tips;
    said relief angle being between about 38° to about 42°, said included angle being from about 45° to about 50° and said tooth depth being about 30% to about 47% of the maximum gullet depth and about 18% to about 26% of the pitch length wherein said tooth form enables better chip ejection which enables faster cutting of the blade; and
    said first and second gullets are defined by a radius, the radius has a length having a radius of about 52% to about 55% of the maximum gullet depth.

9. The reciprocating saw blade according to claim 8 wherein the saw blade includes set and unset teeth.

10. The reciprocating saw blade according to claim 8 wherein said saw blade includes a raker tooth.

* * * * *